Patented Sept. 28, 1943

2,330,607

UNITED STATES PATENT OFFICE 2,330,607

ELECTROLYTE PASTE AND METHOD OF MAKING SAME

Richard Müller and Harry Lee, Radebeul, near Dresden, Germany; vested in the Alien Property Custodian No Drawing. Application April 2, 1940, Serial No. 327,476. In Germany February 6, 1939

4 Claims. (Cl. 136—157)

Our invention relates to the preparation of, and particularly to the gelatinization of the electrolyte used in dry cells. It also concerns the improved electrolyte paste which is thus prepared. According to the invention, the electrolyte in dry cells is to be gelatinized by lignin which is neither soluble nor capable of swelling in water. We have discovered that in particular residues which remain when the cellulose is extrated from vegetable substances, are useful for the instant purposes. We have found such lignin residues as remain in the saccharification of wood, straw and cellulose in general, to be especially suitable as gelatinizing agents.

Until now, the purest rye and wheat flour has been used for gelatinizing the electrolyte used in dry cells. It is of economic import that such a product of great nutritious value be replaced by cheaper substances. Still it is known, that not even potato flour may be used instead of wheat flour ("Kunstdünger und Leim," vol. 34, p. 296, of 1937).

In the past the use of sulphite waste lye, that is a soluble lignin product, as a gelatinizing agent in dry cells (German Patent No. 302,211 and U. S. Patent No. 1,773,445). However, sulphite lye proves to be completely useless as a gelatinizing agent. The electrolyte does not set with the sulphite lye. The mixture remains liquid. After a few hours, the cells are destroyed by foaming and rising of the electrolyte. The electrical characteristics of cells thus made do not in the least measure up to the established standards of good dry cells, not to mention that such cells cannot be used anyhow.

The raw materials used for gelatinization must be insoluble though more or less mucous. Substances acting only as filling agents are unsuitable. That is why the use of wood flour as a thickening agent, even when mixed with wheat flour, does not prove to be successful. Attempts have been made to improve the wood flour and it has been converted into a mucoid by coating it with pectine (Kunstdünger and Leim, vol. 34, p. 269, of 1937). But this attempt at a solution did not satisfy either.

U. S. Patent 1,848,292 suggests that lignin products which are obviously not capable of swelling be used in the manufacture of dry battery. The directions of said patent have been carried out in our experiments, but this did not yield a satisfactory result. Even a lignin capable of swelling does not satisfactorily gelatinize the electrolyte, obviously on account of its high content of free sulphuric acid (30%). Besides, in charging and discharging the batteries, the lignin participates in the electric reactions. The batteries are useless because electric energy stored in them by the charging can only be recovered to a small degree. Therefore, lignin is not adapted as a gelatinizing agent for the manufacture of dry batteries or cells.

After the experiences, which were had with wood flour, it was surprising to the highest degree, that a lignin which remains as an almost valueless residue when cellulose, etc., is extracted from wood by solvents or when cellulose is saccharified, is an excellent gelatinzing agent for dry cells. That is the case even if the material has the appearance and the consistency of sawdust, because it has not been precipitated from solutions, although it may have been first comminuted. It seems that such a lignin product turns mucilageous in the presence of the electrolytes used in dry cells, though originally it is incapable of swelling and has no mucoid structure at all. This may be explained by assuming that a reaction takes place which causes gelatinization between the lignin and the electrolytes used in dry cells, mainly zinc chloride, magnesium chloride and ammonium chloride. Considering the experiences made with wood flour, such a reaction was not to be anticipated. A lignin residue of saccharification or distillation of wood may be produced according to the process set forth in:

Rassow "Lehrbuch der Chemischen Technologie," 20th edition, Leipzig 1938, page 664, second paragraph.

Industrial and Engineering Chemistry, vol. 29, page 251.

The cells made according to our invention meet all practical requirements. The electrical performance is superior to that obtained with wheat flour and is partly even better than that obtained with lignin capable of swelling. Since in the use of such products no preparatory operations and steps are required except washing, crushing and drying, they are especially economical, also when compared with products made from sulphite waste lye. The result is surprising, when it is taken into account what a failure wood flour has proved to be.

Example 1

Dry batteries of the zinc chloride-ammonium chloride type, consisting of three cells, were made. The electrolyte paste contains 20% of a mixture of two-thirds of ground lignin residue as obtained from the saccharification of wood and one third of wheat flour as a gelatinizing agent. When the cells are heated to about 90°, the electrolyte gelatinizes in an excellent manner. Nor is there any "rising" of the electrolyte, as it is noticed to a certain though harmless degree in "wheat flour batteries." Before and during permanent discharge the following readings were taken:

| | |
|---|---|
| Terminal voltage, unconnected | 5.34 volts |
| Starting voltage | 5.04 volts |
| Period of discharge at and above | 2.5 volts:3⅔ hours |
| Total discharge period at and above | 1.8 volts:7.5 hours |

Example 2

Dry batteries of the zinc chloride-ammonium chloride type, consisting of three cells, are made. The gelatinizing agent contains 90% of ground lignin residues and 10% of wheat flour. In order to determine whether the electrolyte turns liquid, the batteries are discharged in a horizontal position and repeatedly shaken and upset during discharge as much as possible. The electrolyte is completely stiff and does not show any disadvantageous foaming or rising. Before and during permanent discharge the following measurements were observed:

| | |
|---|---|
| Terminal voltage, unconnected | 5.37 volts (4.92) |
| Starting voltage | 5.10 volts (4.53) |
| Period of discharge at and above | 2.5 volts:3⅔ hours (3) |
| Total discharge period, at an above | 1.8 volts:7.5 hours (6.5) |

The numbers in parentheses refer to batteries made in the same way but with wheat flour as gelatinizing agent.

Example 3

Dry batteries of the magnesium chloride type are made, consisting of three cells. 20% of a gelatinizing agent consisting of 66⅔% of lignin residue of the saccharification of wood and 33⅓% of wheat flour are added to the electrolyte. Even without being heated to 90°, the electrolyte of the batteries turns stiff within 2 to 3 hours. The result of the permanent discharge is the following:

| | |
|---|---|
| Terminal voltage, unconnected | 5.82 volts |
| Starting voltage | 5.19 volts |
| Period of discharge above and down to | 2.5 volts:2⅓ hours |
| Total discharge period above and down to | 1.8 volts:4½ hours |

Example 4

Dry batteries of the magnesium chloride type, consisting of three cells, are made. The electrolyte contains 20% of a gelatinizing agent, which consists of 90% lignin derived from the saccharification of wood and 10% of wheat flour. Permanent discharge results in:

| | |
|---|---|
| Terminal voltage, unconnected | 5.70 volts |
| Starting voltage | 5.16 volts |
| Period of discharge above and down to | 2.5 volts:2⅓ hours (1⅓) |
| Total discharge period above and down to | 1.8 volts:4½ hours (3¼) |

The numbers in parentheses have the same meaning as in Example 2. The batteries "recover" well, when discharge is interrupted. The storage stability corresponds to what is required of such like batteries.

Having thus described our invention in detail and by way of several examples, yet we do not wish to be limited thereby, except as the state of the art and the appended claims may require, for it is obvious that various modifications and changes may be made in the form of embodiment of our invention, without departing from the spirit and scope thereof.

What we claim is:

1. Preparing a paste of the chloride electrolyte solution for a dry cell, comprising admixing the lignin residue of saccharification of vegetable matter selected from the class consisting of wood and straw as a gelatinizing agent to the electrolyte solution, and gelatinizing the mixture by heating it to substantially 90° C.

2. Preparing a paste of the chloride electrolyte solution for a dry cell, comprising admixing the lignin residue of saccharification of vegetable matter selected from the class consisting of wood and straw as a gelatinizing agent to the electrolyte solution, and gelatinzing the mixture while keeping it at room-temperature.

3. A dry cell containing a chloride electrolyte gelatinized by lignin residue of saccharification of vegetable matter selected from the class consisting of wood and straw.

4. A dry cell containing a chloride electrolyte gelatinized by a mixture of a lignin residue of saccharification of vegetable matter selected from the class consisting of wood and straw with flour.

RICHARD MÜLLER.
HARRY LEE.